(12) United States Patent
Yamashita et al.

(10) Patent No.: US 9,751,562 B2
(45) Date of Patent: Sep. 5, 2017

(54) PARK EXIT ASSIST SYSTEM

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Tomohisa Yamashita, Toyohashi (JP); Masaya Kato, Toyokawa (JP); Hiroyuki Tachibana, Okazaki (JP); Motokatsu Tomozawa, Nagoya (JP); Motonari Obayashi, Nagakute (JP); Hironobu Ishijima, Toyota (JP); Keisuke Oyama, Toyota (JP)

(73) Assignees: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/850,319

(22) Filed: Sep. 10, 2015

(65) Prior Publication Data
US 2016/0075374 A1 Mar. 17, 2016

(30) Foreign Application Priority Data
Sep. 12, 2014 (JP) ................................. 2014-186796

(51) Int. Cl.
*B62D 15/02* (2006.01)

(52) U.S. Cl.
CPC ....... *B62D 15/027* (2013.01); *B62D 15/0285* (2013.01)

(58) Field of Classification Search
CPC .......................... B62D 15/027; B62D 15/0285

USPC .......................................................... 701/41
See application file for complete search history.

(56) References Cited

U.S. PATENT DOCUMENTS

| | | | | |
|---|---|---|---|---|
| 2016/0114795 A1* | 4/2016 | Kiyokawa | ............. | B60W 30/06 342/55 |
| 2016/0132705 A1* | 5/2016 | Kovarik | ............. | G06K 7/10376 340/10.3 |
| 2016/0159397 A1* | 6/2016 | Baek | ..................... | B60W 30/06 701/41 |
| 2016/0185387 A1* | 6/2016 | Kuoch | ................... | B60K 35/00 701/41 |

(Continued)

FOREIGN PATENT DOCUMENTS

| | | |
|---|---|---|
| JP | 4-356277 A | 12/1992 |
| JP | 2009-190531 A | 8/2009 |

*Primary Examiner* — McDieunel Marc
*Assistant Examiner* — James E Stroud
(74) *Attorney, Agent, or Firm* — Sughrue Mion, PLLC

(57) ABSTRACT

A park exit assist system includes an electronic control unit. The electronic control unit is configured to detect a situation around a host vehicle parked or stopped in a parking/stopping area on a roadside. The electronic control unit is configured to calculate, on the basis of a detected result of the situation around the host vehicle, a park exit guidance path along which the host vehicle is moved out of the parking/stopping area to a traffic road and in which a steering angle becomes neutral at the time when a roadside front end of the host vehicle advances into the traffic road. The electronic control unit is configured to guide the host vehicle from the parking/stopping area toward the traffic road by at least executing steering control along the park exit guidance path.

8 Claims, 11 Drawing Sheets

(56) References Cited

U.S. PATENT DOCUMENTS

2016/0185389 A1* 6/2016 Ishijima ............. B62D 15/0285
 701/41
2016/0200359 A1* 7/2016 Boeck .................. B62D 15/025
 701/41

* cited by examiner

F I G . 3
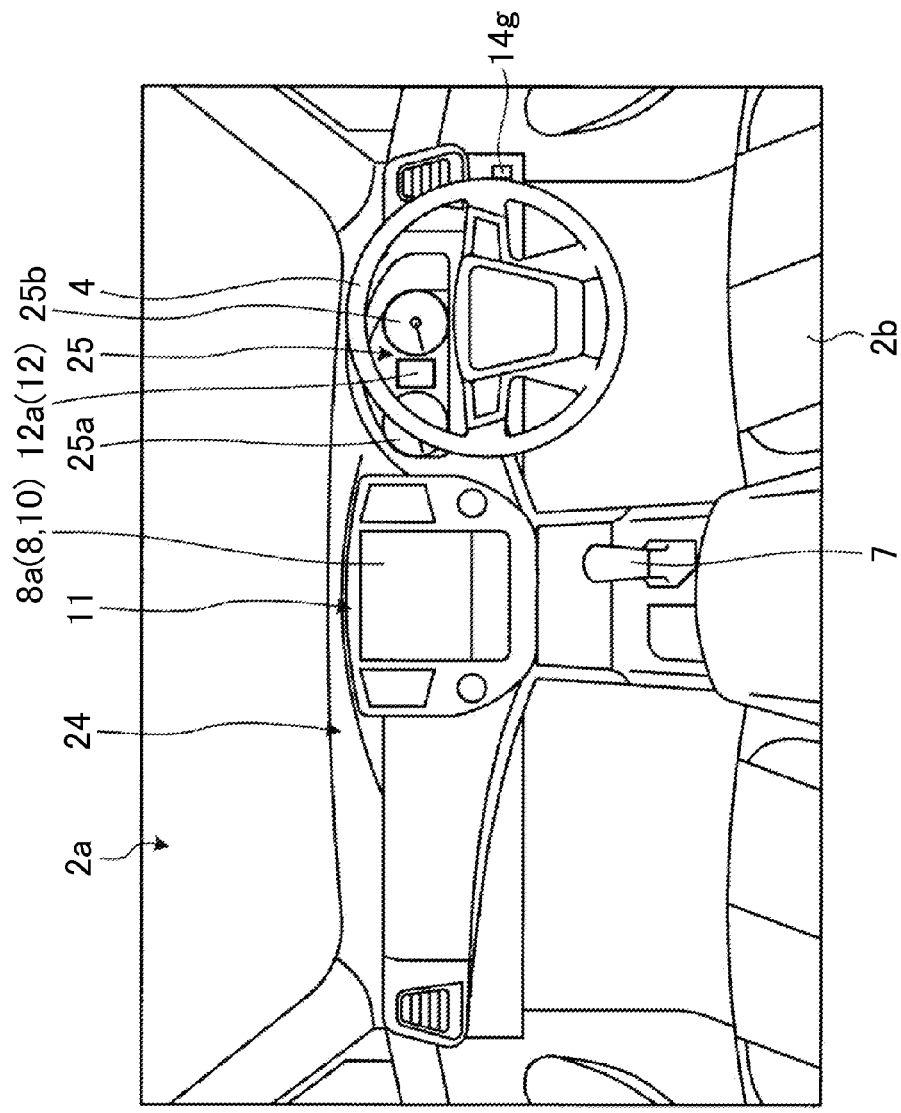

PARK EXIT ASSIST SYSTEM

INCORPORATION BY REFERENCE

The disclosure of Japanese Patent Application No. 2014-186796 filed on Sep. 12, 2014 including the specification, drawings and abstract is incorporated herein by reference in its entirety.

BACKGROUND OF THE INVENTION

1. Field of the Invention

The invention relates to a park exit assist system.

2. Description of Related Art

Generally, there is suggested a parking assist system that searches for a parking space in which a host vehicle is allowed to be parked with the use of various sensors mounted on the vehicle, that calculates an optimal vehicle trajectory to a parking target position set in the parking space and that guides the host vehicle to the parking space in accordance with the vehicle trajectory by automatically executing steering control. There is also suggested a park exit assist system that guides a parked vehicle to start moving (for example, Japanese Patent Application Publication No. 4-356277 (JP 4-356277 A)).

For example, when a vehicle is moved out of one of a plurality of parking spaces provided at a roadside in tandem arrangement, it is required to operate the vehicle to start moving while paying attention to a surrounding obstacle, another vehicle coming from behind, a pedestrian, or the like, and further to correct the direction after exiting to a traffic road and smoothly start driving. Therefore, when park exit assist is performed, it is desired to merge the vehicle into a traffic road with easy operation without complicated steering operation after completion of assist as well.

SUMMARY OF THE INVENTION

An aspect of the invention provides a park exit assist system. The park exit assist system includes an electronic control unit. The electronic control unit is configured to detect a situation around a host vehicle parked or stopped in a parking/stopping area on a roadside, calculate, on the basis of a detected result of the situation around the host vehicle, a park exit guidance path along which the host vehicle is moved out of the parking/stopping area to a traffic road and in which a steering angle becomes neutral at a time when a roadside front end of the host vehicle advances into the traffic road, and guide the host vehicle from the parking/stopping area toward the traffic road by at least executing steering control along the park exit guidance path.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

FIG. 3 is a view of an example of a dashboard of the vehicle according to the embodiment when viewed from the rear side of the vehicle;

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may obtain at least one of various advantageous effects based on a basic configuration or secondary advantageous effects.

A vehicle 1 on which a park exit assist system according to the present embodiment is mounted may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
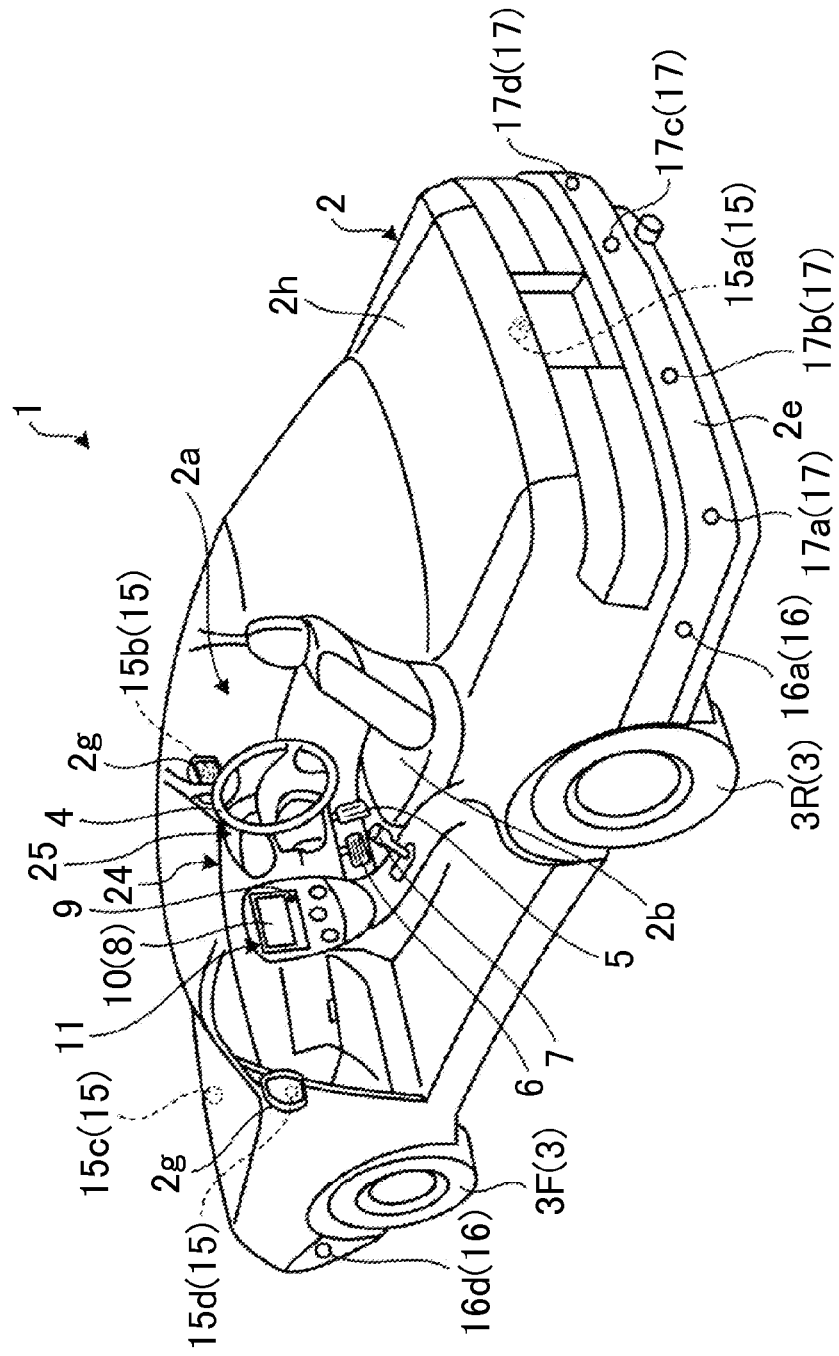

As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an operation input by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2a, different from the monitor device 11. Audio may be output from the audio output device 9 of the monitor device 11 and another audio output device. The monitor device 11 is, for example, shared with a navigation system or an audio system.

A display device 12 different from the display device 8 is provided inside the cabin 2a. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a (FIG. 3) of the display device 8. An image that shows, for example, information about park exit assist for the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8. The park exit assist system that will be described in the present embodiment has a functionally common portion to a parking assist system that guides the vehicle 1 to a parking/stopping area, for example, a parking space, and that parks the vehicle 1. Therefore, the park exit assist system according to the present embodiment is allowed to function as the parking assist system. Conversely, the parking assist system is also allowed to function as the park exit assist system according to the present embodiment. In the present embodiment, such an assist system may be referred to as parking/park exit assist system. In the following description, a park exit function will be mainly described.

Figure 2:
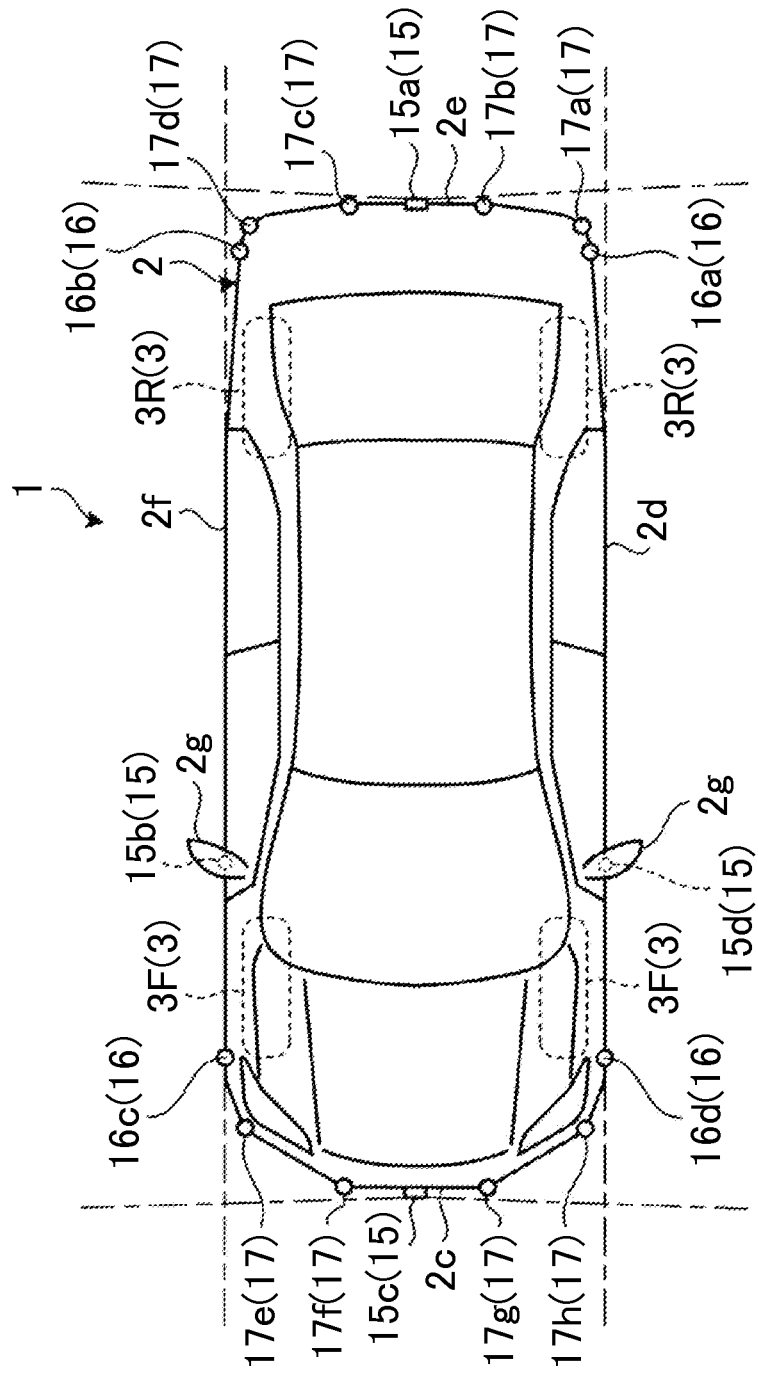
FIG. 2 is an exemplary plan view of the vehicle according to the embodiment.
Figure 4:
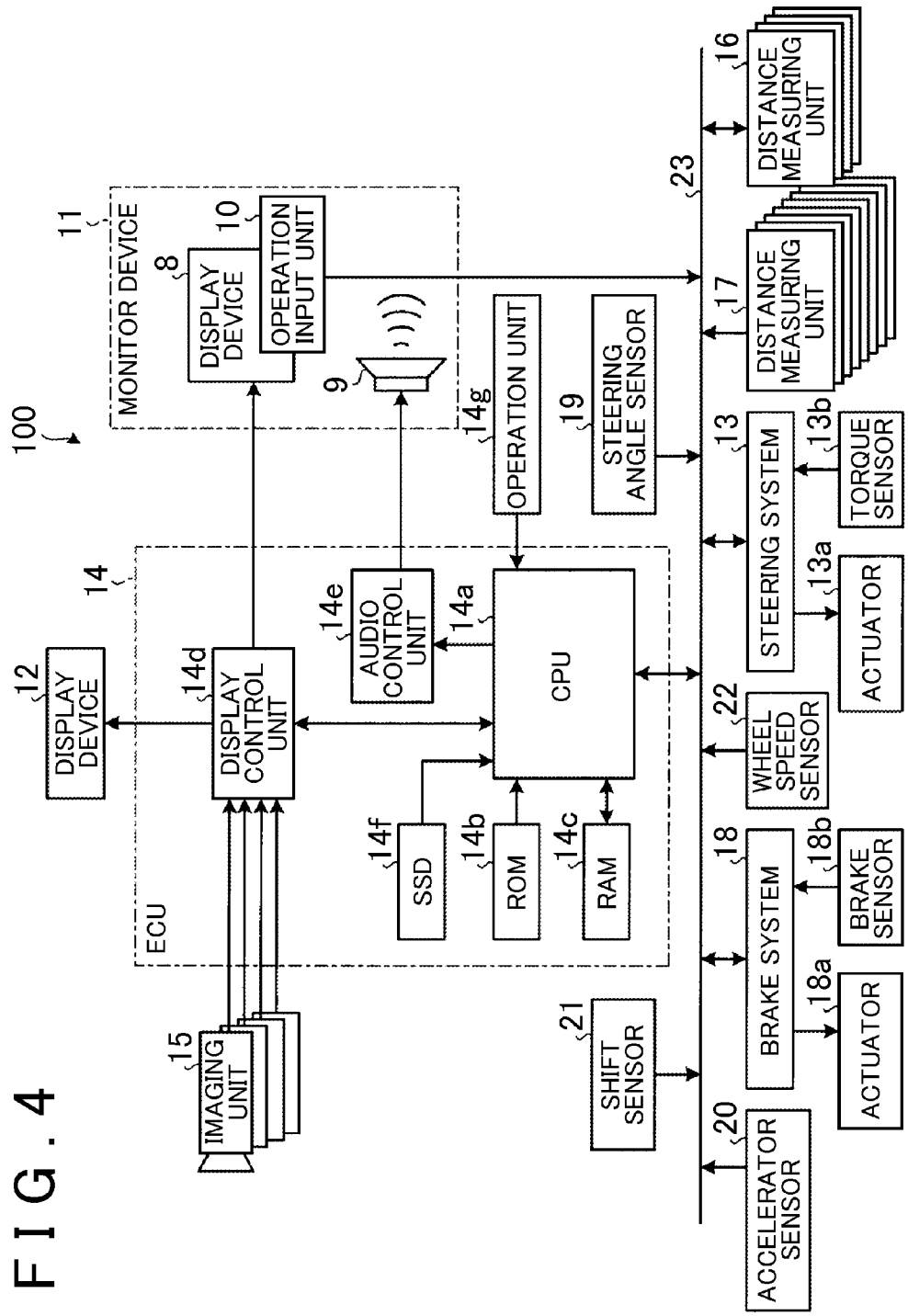
FIG. 4 is an exemplary block diagram of the configuration of a parking/park exit assist system according to the embodiment.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable. As illustrated in FIG. 4, the vehicle 1 includes a steering system that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move, an outside environment around the vehicle body 2, which should be checked at the time when the vehicle 1 is moved out of a parking area, and an outside environment around the vehicle body 2, including an area in which the vehicle 1 is allowed to be parked, and outputs the captured image as captured image data.

The imaging unit 15a is, for example, located at a rear end 2e of the vehicle body 2, and is provided at a lower wall portion of a door 2h of a rear boot. The imaging unit 15b is, for example, located at a right-side end 2f of the vehicle body 2, and is provided at a right-side door mirror 2g. The imaging unit 15c is, for example, located at the front of the vehicle body 2, that is, a front end 2c in the vehicle longitudinal direction, and is provided at a front bumper, or the like. The imaging unit 15d is, for example, located at the left side of the vehicle body 2, that is, a left-side end 2d in the vehicle width direction, and is provided at a door mirror 2g that serves as a left-side projecting portion. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like. The ECU 14 detects a vehicle or a pedestrian around the vehicle 1 and the presence and position of another vehicle that travels on a traffic road from the images of the imaging units 15.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a parking/park exit assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13*b*, a brake sensor 18*b*, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14*a*, a read only memory (ROM) 14*b*, a random access memory (RAM) 14*c*, a display control unit 14*d*, an audio control unit 14*e*, a solid state drive or flash memory (SSD) 14*f*, and the like. The CPU 14*a* is, for example, able to execute various operation processing and control, such as image processing related to images that are displayed on the display devices 8, 12, determination of a moving target position (a park exit target position or a parking target position) of the vehicle 1, computation of a moving path (guidance path) of the vehicle 1, determination as to whether there is an interference with an object, automatic control over the vehicle 1, and cancellation of automatic control. The CPU 14*a* is able to read a program installed and stored in a nonvolatile storage device, such as the ROM 14*b*, and execute operation processing in accordance with the program. The RAM 14*c* temporarily stores various pieces of data that are used for computation in the CPU 14*a*. The display control unit 14*d* mainly executes image processing by the use of image data obtained by the imaging units 15, synthesis of image data that are displayed on the display device 8, and the like, within the operation processing in the ECU 14. The audio control unit 14*e* mainly processes audio data that are output from the audio output device 9 within the operation processing in the ECU 14. The SSD 14*f* is a rewritable nonvolatile storage unit, and is able to store data even when the power of the ECU 14 is turned off. The CPU 14*a*, the ROM 14*b*, the RAM 14*c*, and the like, may be integrated within the same package. The ECU 14 may be formed of another logical operation processor, such as a digital signal processor (DSP), a logical circuit, or the like, instead of the CPU 14*a*. A hard disk drive (HDD) may be provided instead of the SSD 14*f*. The SSD 14*f* or the HDD may be provided separately from the ECU 14.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and, by extension, the vehicle 1, via the actuator 18*a*. The brake system 18 is able to execute various controls by detecting locking up of the wheels by the brake, a spin of the wheels 3, a sign of a side slip, and the like, from, for example, a rotation difference between the right and left wheels 3. The brake sensor 18*b* is, for example, a sensor that detects the position of a movable unit of the brake operation unit 6. The brake sensor 18*b* is able to detect the position of the brake pedal that serves as the movable unit. The brake sensor 18*b* includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed, as a sensor value. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
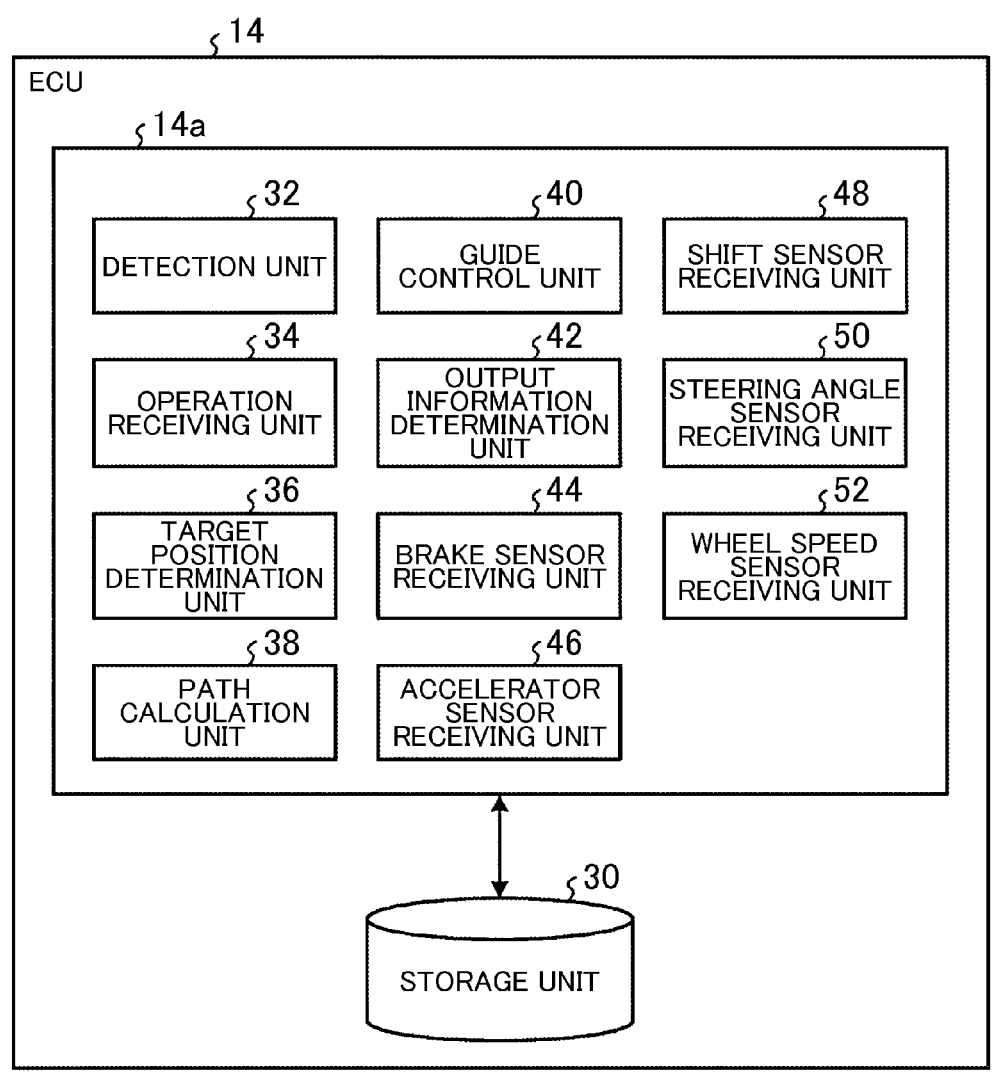
FIG. 5 is an exemplary block diagram of the configuration of an ECU of the parking/park exit assist system according to the embodiment.

As shown in FIG. 5, the ECU 14 includes the CPU 14*a* and a storage unit 30 that stores data that are used in computation in the CPU 14*a* or data calculated in computation in the CPU 14*a*. The CPU 14*a* includes various modules that are implemented by reading programs installed and stored in a storage device, such as the ROM 14*b*, and executing the programs. For example, the CPU 14*a* includes a detection unit 32, an operation receiving unit 34, a target position determination unit 36, a path calculation unit 38, a guidance control unit 40, an output information determination unit 42, a brake sensor receiving unit 44, an accelerator sensor receiving unit 46, a shift sensor receiving unit 48, a steering angle sensor receiving unit 50, a wheel speed sensor receiving unit 52, and the like.

The detection unit 32 detects an obstacle around the vehicle 1, a frame line or partition line on a road surface, or the like, on the basis of information that is provided from the imaging units 15 and the distance measuring units 16, 17. The detection unit 32 may function as a detection unit that detects an area to which the vehicle 1 is allowed to be moved out of a parking/stopping area, that is, a space to which the vehicle 1 escapes from the parking/stopping area, on the basis of the detected obstacle, frame line, partition line, or the like. The operation receiving unit 34 acquires a signal that is input through operation of the operation unit 14g. The operation unit 14g is, for example, a push button, a switch, or the like. A request for park exit assist or a cancellation of park exit assist is allowed to be performed with the use of the operation unit 14g. The target position determination unit 36 determines a moving target position, that is, park exit target position, of the vehicle 1. The path calculation unit 38 calculates a park exit guidance path (moving path) for guiding the vehicle 1 from the current position of the vehicle 1 to the park exit target position. The guidance control unit 40 controls the portions of the vehicle 1 such that the vehicle 1 moves to the park exit target position (moving target position) along the moving path. The output information determination unit 42 determines information that is output through the display device 12, the display device 8, the audio output device 9, or the like, an output mode of the information, and the like.

The brake sensor receiving unit 44 acquires a signal that is output from the brake sensor 18b, that is, a signal based on operation input of the brake operation unit 6, for example, the brake pedal. The brake sensor receiving unit 44 functions as an intention confirmation unit that acquires an intention confirmation signal indicating a driver's (user's) intention to decelerate or stop the vehicle. The brake sensor receiving unit 44 may acquire an input operation of a parking brake (not shown) or may function to acquire an intention confirmation signal indicating a driver's intention to stop the vehicle on the basis of the operation input. The accelerator sensor receiving unit 46 acquires a signal that is output from the accelerator sensor 20, that is, a signal based on operation input of the accelerator operation unit 5, for example, the accelerator pedal. The accelerator sensor receiving unit 46 functions as an intention confirmation unit that acquires an intention confirmation signal indicating a driver's intention to drive or accelerate. The shift sensor receiving unit 48 acquires a signal that is output from the shift sensor 21, that is, a signal based on operation input of the shift operation unit 7, for example, the shift lever. The shift sensor receiving unit 48 functions as an intention confirmation unit that acquires an intention confirmation signal indicating a driver's intention to move the vehicle forward upon reception of a signal indicating D position and that acquires an intention confirmation signal indicating a driver's intention to move the vehicle backward upon reception of a signal indicating R position. Similarly, the shift sensor receiving unit 48 functions as an intention confirmation signal that acquires an intention confirmation signal indicating a driver's intention to park or stop the vehicle upon reception of a signal indicating P position. The steering angle sensor receiving unit 50 acquires a signal that is output from the steering angle sensor 19, that is, a signal based on operation input of the steering unit 4, for example, the steering wheel. The steering angle sensor receiving unit 50 functions as an intention confirmation unit that acquires a steering state of the vehicle 1, which is automatically controlled by the guidance control unit 40, and that acquires an intention confirmation signal indicating a driver's intention to steer the vehicle. The wheel speed sensor receiving unit 52 functions as an acquisition unit that acquires a signal that is output from the wheel speed sensor 22, that acquires information about determination as to whether the vehicle 1 is traveling or stopped on the basis of the vehicle speed, and that acquires information about determination as to whether a guidance state in the case of automatically guiding the vehicle to be moved out of the parking/stopping area is appropriate. An example in which the above-described modules are configured separately by functions is described. Instead, two or more functions may be configured in an integrated manner. For example, the brake sensor receiving unit 44, the accelerator sensor receiving unit 46, the shift sensor receiving unit 48, the steering angle sensor receiving unit 50 and the wheel speed sensor receiving unit 52 may be integrated as a sensor receiving unit.

Figure 6:
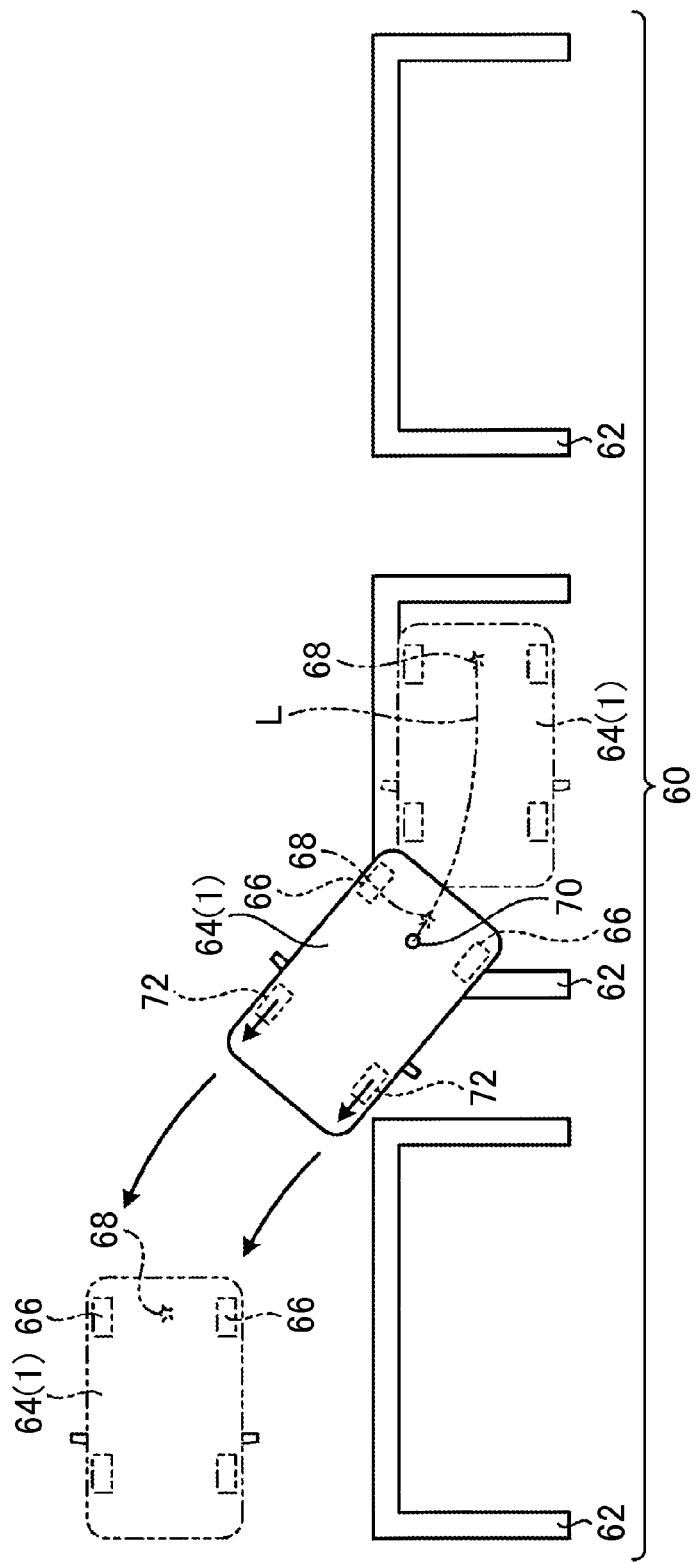
FIG. 6 is a view that illustrates a state of a behavior and guidance of a vehicle in a parking/stopping area for the purpose of illustrating a park exit assist process of the parking/park exit assist system according to the embodiment.

FIG. 6 is a view that illustrates a behavior in the case where the vehicle on which the parking/park exit assist system 100 is mounted is moved out of the parking/stopping area and a state of guidance based on the park exit target position and the park exit guidance path. In the case shown in FIG. 6, the parking/stopping area is, for example, a parking place 60 for parallel parking, provided on the roadside of a traffic road, and a parking space is partitioned one by one by a plurality of partition lines 62 drawn on a flat road. FIG. 6, for example, shows three parking spaces. A host vehicle 64 is equivalent to the vehicle 1 described with reference to FIG. 1 to FIG. 3, and the parking/park exit assist system 100 described with reference to FIG. 4 is mounted on the host vehicle 64. The host vehicle 64, for example, has a guidance reference point 68 at substantially the center of an axle that couples right and left rear wheels 66. The position of the guidance reference point 68 is not limited to the position in the axle, and may be set at any position in the host vehicle 64. For example, the position of the guidance reference point 68 may be set at a position in an axis that couples right and left front wheels or may be set at the center of the front bumper of the host vehicle 64. The host vehicle 64 is guided such that the guidance reference point 68 is brought into substantially coincidence with a park exit target position 70 that is set around an exit of the parking/stopping area (parking space) and that is determined in advance of the start of the guidance, thus assisting in moving the host vehicle 64 out of the parking/stopping area (parking space) toward the traffic road.

The detection unit 32 detects whether there is an exit space in the parking/stopping area (parking space). The exit space is a space that the host vehicle 64 parked in the parking space defined by a partition line 62 utilizes to exit to the traffic road at the time when the host vehicle 64 is moved out of the parking space. In order for the host vehicle 64 to be moved out of the parking/stopping area, at least an exit space wider by a predetermined amount than the vehicle width of the host vehicle 64 is required. In this case, the detection unit 32 collects information that indicates a situation around the host vehicle 64 with the use of the imaging units 15 and the distance measuring units 16, 17 in order to detect an exit space. For example, the detection unit 32 detects the statuses of the parking spaces ahead of and behind the host vehicle 64, whether there is an obstacle (pedestrian, bicycle, or the like) around the host vehicle 64, the size of an obstacle, a distance to an obstacle, and the like. The imaging units 15 detect an object, such as another vehicle traveling on the traffic road and a pedestrian, and detect a distance to the object.

For example, the distance measuring units 17e to 17h and imaging unit 15c at the vehicle front side in FIG. 2 mainly detect the situation of the parking space ahead of the host vehicle 64. Similarly, the distance measuring units 17a to 17d and imaging unit 15a at the vehicle rear side in FIG. 2 mainly detect the situation of the parking space behind the host vehicle 64. The distance measuring units 16b, 16c and imaging unit 15b at the vehicle right side in FIG. 2 and, in addition, the imaging units 15a, 15c having a wide viewing angle mainly detect the situation on the traffic road side. Where necessary, the distance measuring units 16a, 16d and imaging unit 15d at the vehicle left side in FIG. 2 and, in addition, the imaging units 15a, 15c having a wide viewing angle may detect the situation on the roadside.

An exit space may be searched on the assumption that the host vehicle 64 exits from the current stop position while turning. When there is allowance space ahead and behind the host vehicle 64, for example, when there is allowance space behind the host vehicle 64, which allows the host vehicle 64 to move backward, an exit space may be searched on the assumption that the host vehicle 64 once moves backward and then exits from that position while turning. An exit space may be searched on the assumption that not only the host vehicle 64 moves backward once but also the host vehicle 64 moves forward and backward while maneuvering (turning) the steering wheel multiple times and then exits from that position while turning.

When the exit space has been detected, the target position determination unit 36 determines the park exit target position 70 that is utilized in order to guide the host vehicle 64. In the case of the present embodiment, the target position determination unit 36 sets the park exit target position 70 to which the host vehicle 64 is guided toward the traffic road without collision of a roadside (a side opposite to the traffic road) front end of the host vehicle 64 with a surrounding obstacle. As described above, because the guidance reference point 68 is set at the predetermined position in the host vehicle 64, distances from the guidance reference point 68, as a reference, to outline portions of the host vehicle 64 are known. Therefore, when the situation around the host vehicle 64 has been detected and the positions of the outline portions of the host vehicle 64 and the position of the exit space are acquired, it is possible to determine the park exit target position 70. That is, because it is possible to calculate a path of the guidance reference point 68 in the host vehicle 64 such that the roadside front end of the host vehicle 64 is allowed to advance toward the traffic road without collision with a surrounding obstacle, it is possible to back calculate the park exit target position 70.

For example, when there is no parked vehicle in the parking/stopping area ahead of the host vehicle 64, it means that there is no obstacle that becomes a reference in the case where the park exit target position 70 is determined. In such a case, a traffic road-side rear end corner position of the partition line 62 ahead of the host vehicle 64 is detected by the imaging unit 15c, and the park exit target position 70 just needs to be determined such that the traffic road-side rear end position of the partition line 62 and the roadside front end of the host vehicle 64 do not cross each other, that is, the host vehicle 64 does not pass over the partition line 62.

Subsequently, the path calculation unit 38 calculates a park exit guidance path L such that the guidance reference point 68 passes through the calculated park exit target position 70. Various known path calculation methods are usable to calculate the park exit guidance path L, and the detailed description is omitted. In the case of the present embodiment, in order to merge the host vehicle 64 into a traffic road with easy operation without complicated steering wheel operation after completion of park exit assist, the park exit guidance path L is calculated such that the steering angle becomes neutral at the time when the roadside front end of the host vehicle 64 advances into the traffic road, as shown in FIG. 6. In other words, when the roadside front end of the host vehicle 64 has advanced to the traffic road without collision with an obstacle, the steering angle becomes neutral, and park exit assist completes. In this way, by completing park exit assist at the neutral steering angle, the host vehicle 64 is placed in a straight ahead traveling state at the time of merging into the traffic road. That is, the behavior of the host vehicle 64 at the time when park exit assist completes is easily acquired, so the user just needs to direct the host vehicle 64 from a straight ahead traveling state to a desired direction. As a result, steering at the time of merging into the traffic road becomes easy.

Figure 7:
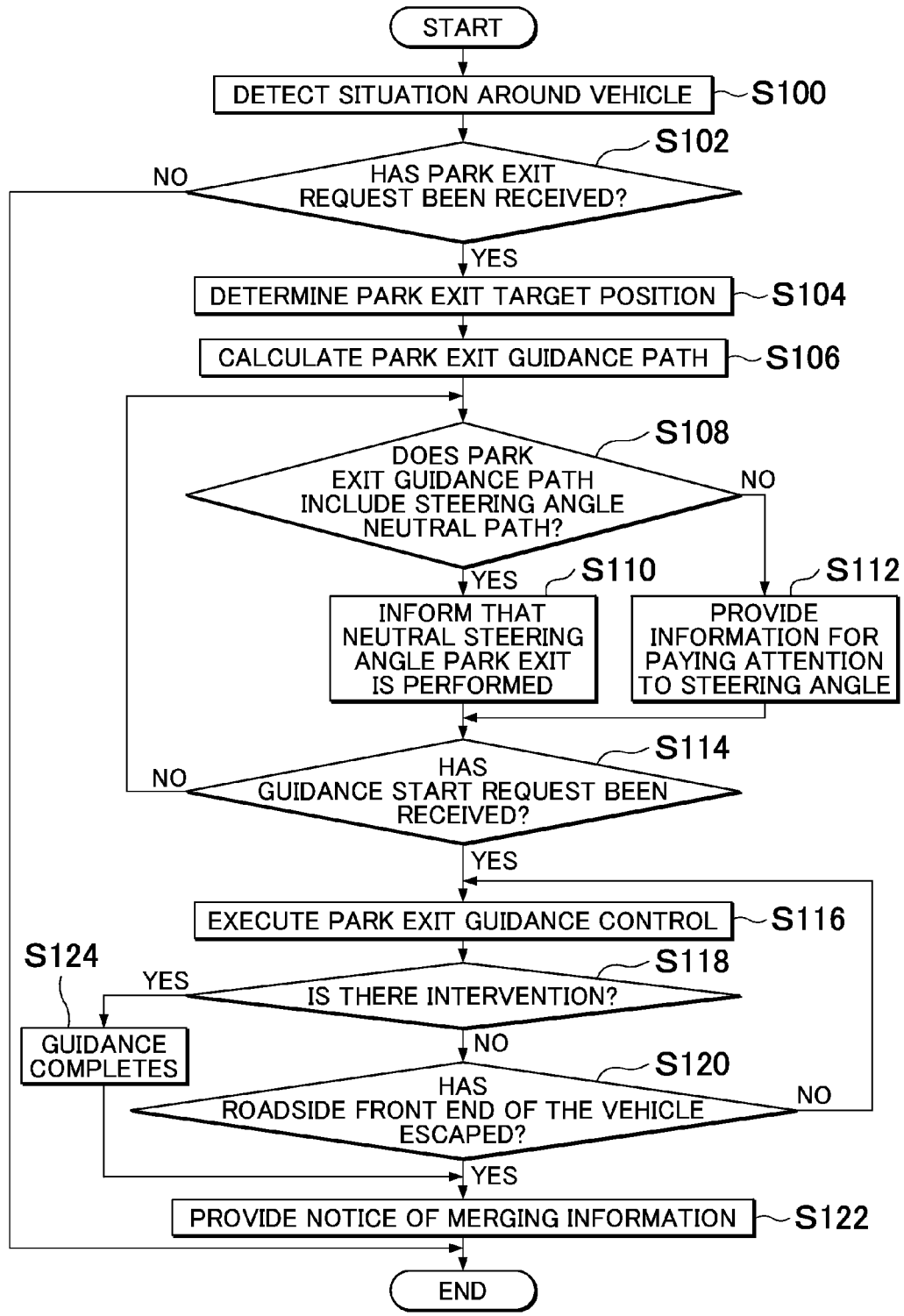
FIG. 7 is a flowchart that illustrates the park exit assist process of the parking/park exit assist system according to the embodiment.

The details of the procedure of a park exit assist process by the above-described parking/park exit assist system 100 will be described with reference to the flowchart of FIG. 7.

Initially, when the power of the host vehicle 64 is turned on, the detection unit 32 detects a situation around the parked or stopped host vehicle 64 with the use of the imaging units 15 and the distance measuring units 16, 17 (S100). The operation receiving unit 34 monitors whether a park exit request for requiring the host vehicle 64 to be moved out of a parking/stopping area through park exit assist control has been received through user's operation of the operation unit 14g. When the operation receiving unit 34 has not received a park exit request (No in S102), the flow is once ended. While the power of the host vehicle 64 remains on, the detection unit 32 continuously detects the situation around the host vehicle 64 via the imaging units 15 and the distance measuring units 16, 17, and updates latest information.

When the operation receiving unit 34 has received a park exit request (Yes in S102), the target position determination unit 36 determines the park exit target position 70 (S104), and the path calculation unit 38 calculates the park exit guidance path L (S106).

The guidance control unit 40 checks whether the park exit guidance path L calculated by the path calculation unit 38 is the park exit guidance path L including a steering angle neutral path in which the steering angle of the front wheels 72 becomes neutral at the time of completion of the guidance as shown in FIG. 6 (S108). As described above, the path calculation unit 38 attempts to calculate the park exit guidance path L including the steering angle neutral path. However, realistically, the park exit guidance path L may not include the steering angle neutral path depending on whether there is an obstacle around the host vehicle 64, the parking position of the host vehicle 64 in the parking space, whether it is allowed to maneuver (turn) the steering wheel (for changing a moving direction of the host vehicle 64 between a forward direction and a reverse direction) within the parking space, and the like. When it is determined in S108 that the park exit guidance path L includes the steering angle neutral path (Yes in S108), the guidance control unit 40 informs that neutral steering angle park exit is performed as shown in FIG. 8 via the output information determination unit 42 (S110).

Figure 8:
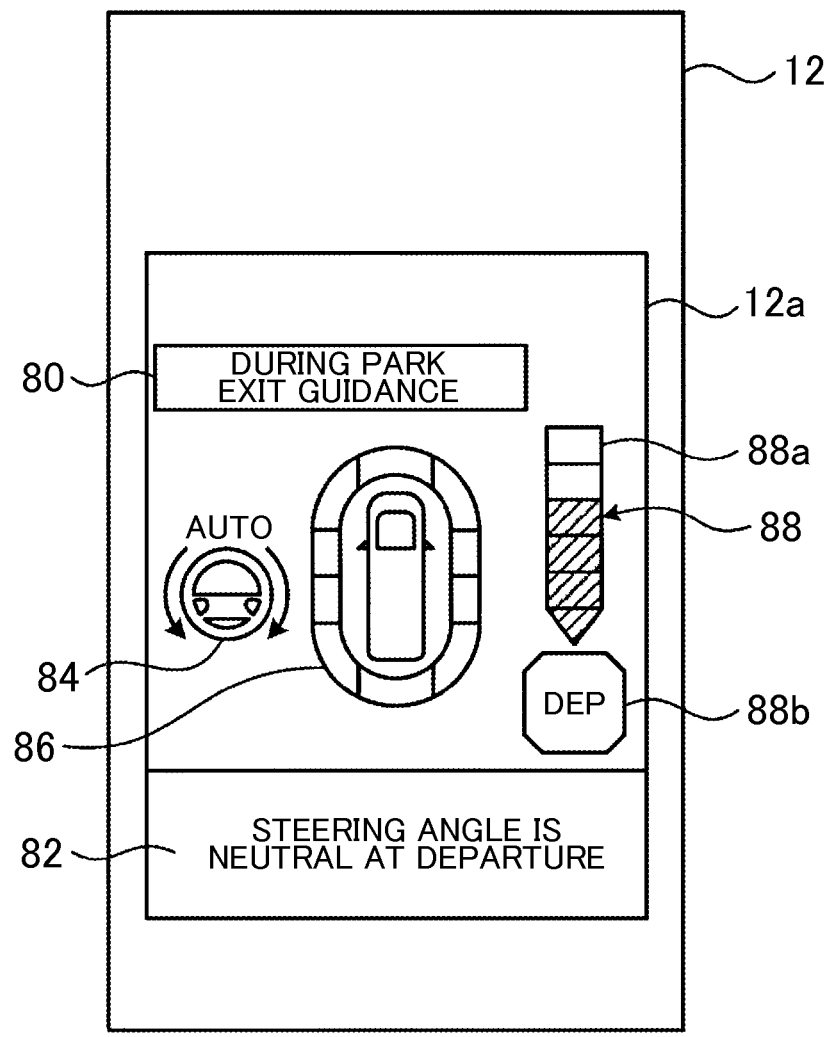
FIG. 8 is an example of a screen of a display device that displays information about guidance in the parking/park exit assist system according to the embodiment and is a view that shows an example of display in the case where a steering angle will become neutral.

FIG. 8 shows an example of the screen 12a that is shown on the display device 12 at the start of park exit guidance control or during park exit guidance control. The screen 12a includes a first display region 80 and a second display region 82 that display a control state during park exit assist control, a message to the user and an operation command. During park exit assist control, for example, "DURING PARK EXIT GUIDANCE" is displayed in the first display region 80. This display may be shown with blinking or highlighted color, such as red color, in order to call user's attention. For example, a message that provides a notice, or the like, at the time when the vehicle is moved out of a parking/stopping area, such as "STEERING ANGLE BECOMES NEUTRAL AT DEPARTURE", or the like, is displayed in the second display region 82. In this case as well, in order to call user's attention, the message may be displayed with blinking or highlighted color. Other than the above, a steering symbol 84 that indicates that automatic steering control is being executed, a surrounding detection symbol 86 that indicates whether there is an obstacle that should be noted around the host vehicle 64, and a completion indicator 88 that indicates an approximate period up to completion of park exit assist. When steering control is being executed by the guidance control unit 40, the steering symbol 84 lights up to indicate that automatic steering is performed. The steering symbol 84 may be displayed at a rotation angle corresponding to an actual steering angle. The surrounding detection symbol 86 is configured such that individual symbols are arranged around a vehicle symbol. When there is an obstacle within a preset warning distance based on the detected result of the detection unit 32, the individual symbol indicating the direction in which there is an obstacle may be configured to light up. Each individual symbol may be displayed with, for example, "blue color" during steady time, and, when an obstacle to be warned has been detected, may change from "blue color" to "red color". The completion indicator 88 includes an indicator 88a and a target symbol 88b. The indicator 88a indicates a period up to completion of the guidance by an increase or reduction in the number of individual blocks each indicating a unit period. The target symbol 88b indicates completion of the guidance (departure, DEP). The details of display on the screen 12a are illustrative, and, where necessary, a display item may be changed or a display mode may be changed.

Figure 9:
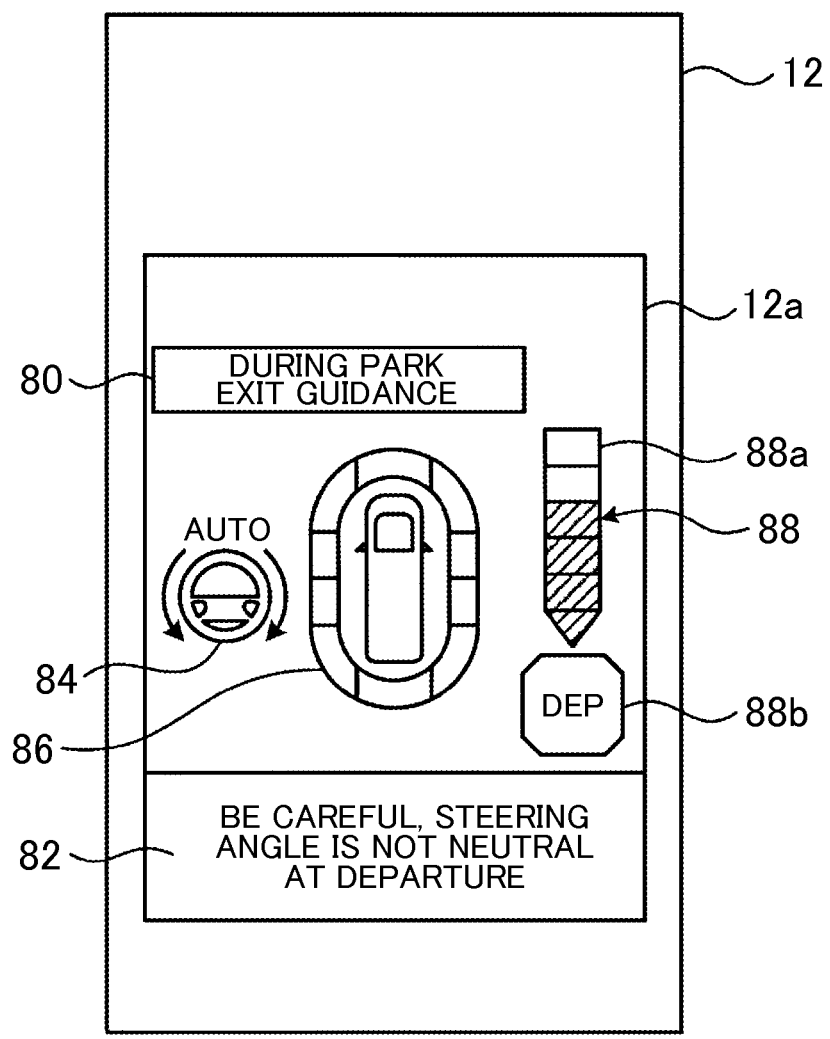
FIG. 9 is an example of a screen of the display device that displays information about guidance in the parking/park exit assist system according to the embodiment and is a view that shows an example of display in the case where the steering angle will not become neutral.

When it is determined in S108 that the park exit guidance path L does not include the steering angle neutral path (No in S108), the guidance control unit 40 provides information for paying attention to the steering angle as shown in FIG. 9 via the output information determination unit 42 (S112). In this case, for example, "DURING PARK EXIT GUIDANCE" is displayed in the first display region 80. A reminding message, such as "BE CAREFUL, STEERING ANGLE IS NOT NEUTRAL AT DEPARTURE", is displayed in the second display region 82. In this case, because the user needs to be reminded, it is desired to display the message with blinking or highlighted color, such as red color.

In the case of park exit assist, because it is required to start moving the vehicle in consideration of another vehicle traveling on a traffic road, the guidance control unit 40 checks whether there is user's operation to start moving the vehicle, for example, whether a guidance start request that is represented by an operation, such as releasing depression of the brake pedal and depressing the accelerator pedal, has been received (S114). For example, releasing depression of the brake pedal is allowed to be checked by the use of a signal from the brake sensor receiving unit 44. Depression of the accelerator pedal is allowed to be checked by the use of a signal from the accelerator sensor receiving unit 46. When a guidance start request has been received (Yes in S114), the guidance control unit 40 executes park exit guidance control by basically causing the host vehicle 64 to move along the calculated park exit guidance path L by the use of driving force based on creeping while executing steering control by the steering system 13 (S116).

Figure 10:
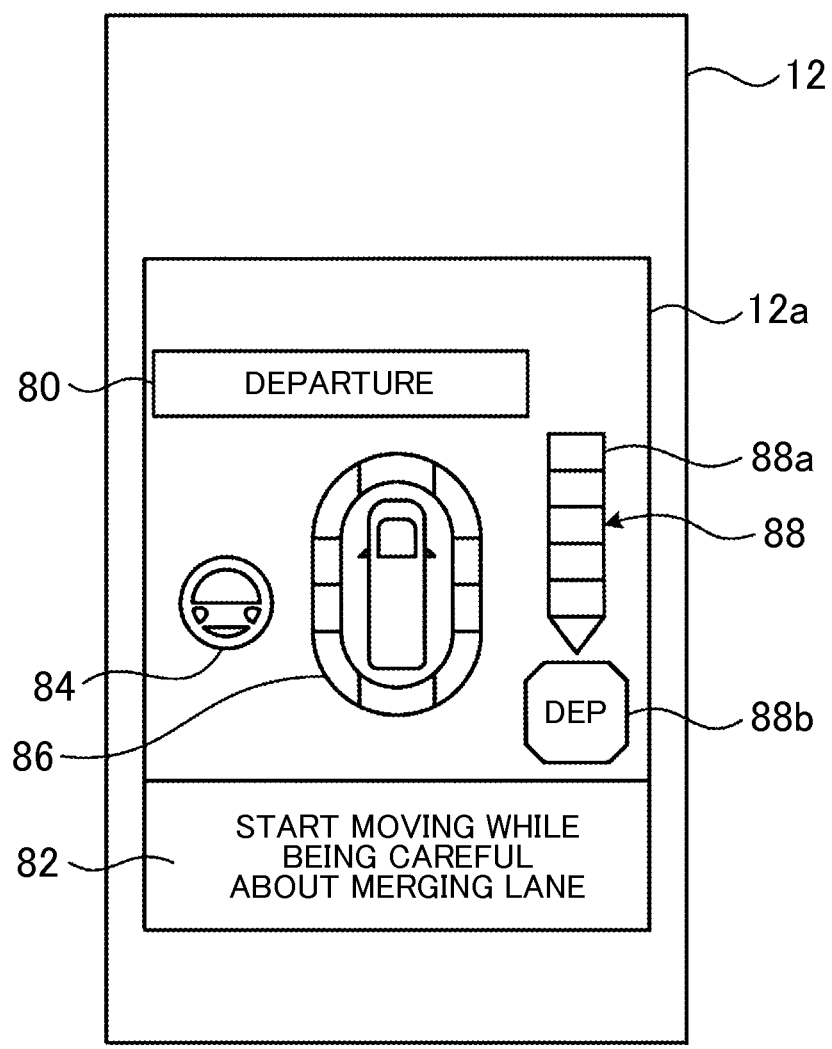
FIG. 10 is a view that shows an example of display of a screen of the display device at the time of completion of assist in the parking/park exit assist system according to the embodiment.

The guidance control unit 40 monitors during park exit control whether there is users intervention (S118). The user's intervention is, for example, an operation to start steering by the user through steering wheel operation or an operation to attempt to move the vehicle out of a parking/stopping area by accelerating the vehicle through operation of the accelerator pedal. When there is no such user's intervention (No in S118), the guidance control unit 40 checks whether the roadside front end of the host vehicle 64 has escaped to the traffic road (S120). In this case, it may be checked whether the guidance reference point 68 has reached the park exit target position 70 or where the guidance reference point 68 of the host vehicle 64 is located in the current park exit guidance path L. When it has been checked in S120 that the roadside front end of the host vehicle 64 has escaped to the traffic road (Yes in S120), the guidance control unit 40 provides a notice of merging information as shown in FIG. 10 via the output information determination unit 42 (S122). In this case, for example, "DEPARTURE" is displayed in the first display region 80. A message, such as "START MOVING WHILE BEING CAREFUL ABOUT MERGING LANE", is displayed in the second display region 82. In this case, because park exit assist control has been completed, the steering symbol 84 or the completion indicator 88 may be turned off.

Figure 11:
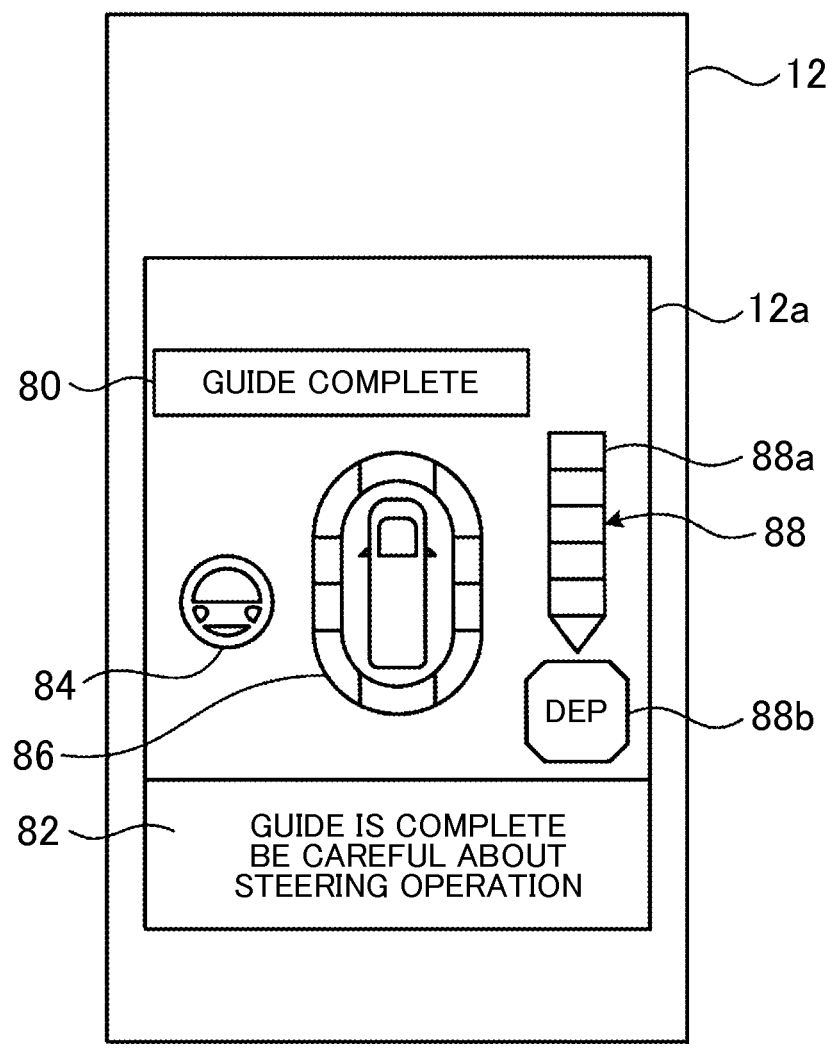
FIG. 11 is a view that shows an example of a screen of the display device in the case where park exit assist is stopped in the parking/park exit assist system according to the embodiment.

When there is user's intervention in the middle of the guidance in S118 (Yes in S118), the guidance control unit 40 assumes that a request to guide the host vehicle 64 to be moved out of the parking/stopping area has been cancelled. That is, the guidance control unit 40 assumes that the guidance has completed (S124). For example, the steering wheel is set to a free state by stopping automatic control over the steering system 13. Because the guidance is stopped after the host vehicle 64 has already started moving, the guidance control unit 40 provides a notice of merging information as shown in FIG. 11 via the output information determination unit 42 (S122). In this case, for example, "GUIDE COMPLETE" is displayed in the first display region 80. A message, such as "GUIDE IS COMPLETE. BE CAREFUL ABOUT STEERING OPERATION" is displayed in the second display region 82. In this case, a stop of the guidance is based on a use's intention; however, because the steering angle varies depending on the timing of the stop, that is, the progress of the guidance, the shape of the park exit guidance path L, and the like, particularly, the second display region 82 is desirably displayed with blinking or highlighted color, such as red color, for reminding. In this case, because park exit assist control is stopped, the steering symbol 84 or the completion indicator 88 may be turned off. According to the embodiment, for example, a park exit operation based on user's determination is allowed even in the middle of park exit guidance, so it is possible to smoothly move the vehicle out of the parking/stopping area commensurately with the user's intention.

In the above-described embodiment, there is a case where the park exit guidance path L calculated in S106 is a path in which the steering angle becomes neutral before advance of the roadside front end of the host vehicle 64 from the parking/stopping area completes. In such a case, the guidance control unit 40, during park exit guidance control in S116, may assume that the guidance of the host vehicle 64 has completed when the steering angle becomes neutral through the guidance based on the park exit guidance path L. In this case, when the steering angle already becomes neutral within the parking/stopping area, the behavior of the host vehicle 64 is straight and is easily understandable by the user. Therefore, by completing the guidance in this state, the user is caused to understand that park exit assist has quickly completed, and it is possible to cause the host vehicle 64 to merge into the traffic road through operation with allowance at user's desired timing after completion of the guidance.

In the above-described embodiment, the status of park exit assist is provided to the user by mainly displaying the screen 12a on the display device 12. In addition to or instead of this, the output information determination unit 42 may provide the status of park exit assist to the user by voice from the audio output device 9 via the audio control unit 14e.

A parking assist program that is executed in the guidance control unit 40 or the output information determination unit 42 according to the present embodiment may be configured to be recorded in a computer-readable storage medium in an installable file or an executable file, and provided. The computer readable storage medium includes a CD-ROM, a flexible disk (FD), a CD-R, a digital versatile disk (DVD), and the like.

The parking assist program that is executed in the guidance control unit 40 or the output information determination unit 42 according to the present embodiment may be configured to be stored in a computer connected to a network, such as the Internet, and provided through downloading via the network. The parking assist program that is executed in the guidance control unit 40 or the output information determination unit 42 according to the present embodiment may be configured to be provided or distributed via a network, such as the Internet.

In the present embodiment, the example in which a notice for parking assist is provided by the screen 12a that is displayed on the display device 12 is described. In another embodiment, a notice of similar details may be provided through voice by using the audio output device 9. It is possible to provide parking assist that is easily understandable by the user by providing both information through the screen 12a and information through voice.

The embodiment and alternative embodiment of the invention are described above; however, the embodiment and alternative embodiment are only illustrative and not intended to limit the scope of the invention. These novel embodiments may be implemented in other various forms, and may be variously omitted, replaced or changed without departing from the spirit of the invention. The scope and spirit of the invention encompass these embodiments and their modifications, and the invention described in the appended claims and equivalents thereof encompass these embodiments and their modifications.

What is claimed is:

1. A park exit assist system comprising:
an electronic control unit configured to:
detect a situation around a host vehicle parked or stopped in a parking/stopping area on a roadside;
calculate, on the basis of a detected result of the situation around the host vehicle, a park exit guidance path along which the host vehicle is moved out of the parking/stopping area to a traffic road and in which a steering angle becomes neutral at a time of completion of park exit guidance when a roadside front end of the host vehicle advances into the traffic road; and
guide the host vehicle from the parking/stopping area toward the traffic road by at least executing steering control along the park exit guidance path.

2. The park exit assist system according to claim 1, wherein
the electronic control unit is configured to, when the electronic control unit receives an operation input of a steering wheel in a middle of guiding the host vehicle along the park exit guidance path, complete guiding the host vehicle on an assumption that a request to guide the host vehicle has been cancelled.

3. The park exit assist system according to claim 2, wherein
the electronic control unit is configured to, when the electronic control unit receives an operation input of an accelerator in the middle of guiding the host vehicle along the park exit guidance path, complete guiding the host vehicle on the assumption that the request to guide the host vehicle has been cancelled.

4. The park exit assist system according to claim 3, wherein
the electronic control unit is configured to, when the calculated park exit guidance path is a path along which the steering angle becomes neutral before the roadside front end of the host vehicle completes advancing into the traffic road from the parking/stopping area, assume that guiding of the host vehicle has completed when the steering angle becomes neutral through guiding based on the park exit guidance path.

5. The park exit assist system according to claim 2, wherein
the electronic control unit is configured to, when the calculated park exit guidance path is a path along which the steering angle becomes neutral before the roadside front end of the host vehicle completes advancing into the traffic road from the parking/stopping area, assume that guiding of the host vehicle has completed when the steering angle becomes neutral through guiding based on the park exit guidance path.

6. The park exit assist system according to claim 1, wherein
the electronic control unit is configured to, when the electronic control unit receives an operation input of an accelerator in a middle of guiding the host vehicle along the park exit guidance path, complete guiding the host vehicle on an assumption that a request to guide the host vehicle has been cancelled.

7. The park exit assist system according to claim 1, wherein
the electronic control unit is configured to, when the calculated park exit guidance path is a path along which the steering angle becomes neutral before the roadside front end of the host vehicle completes advancing into the traffic road from the parking/stopping area, assume that guiding of the host vehicle has completed when the steering angle becomes neutral through guiding based on the park exit guidance path.

8. The park exit assist system according to claim 1, wherein
the electronic control unit is configured to, when the electronic control unit cannot calculate a park exit guidance path in which the steering angle becomes neutral at the time when the roadside front end of the host vehicle advances into the traffic road, provide a user with information for paying attention to the steering angle.

* * * * *